Aug. 27, 1963
M. D. JENNINGS
3,101,826
INTERMITTENT CLUTCH
Filed Dec. 18, 1961
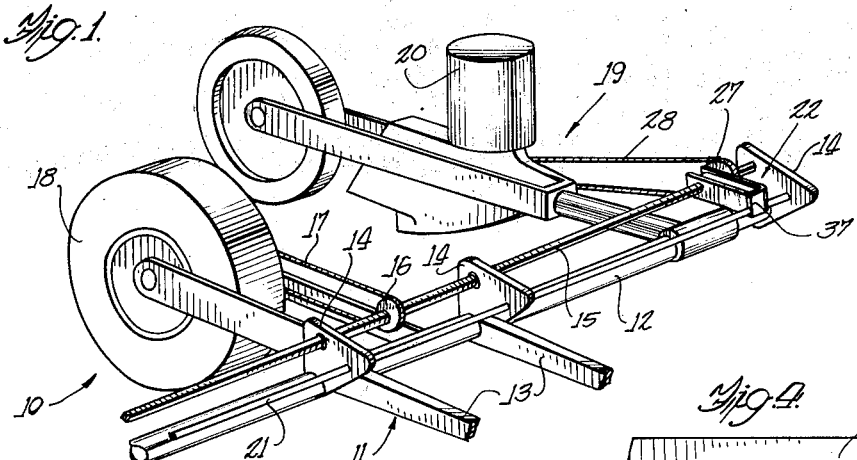
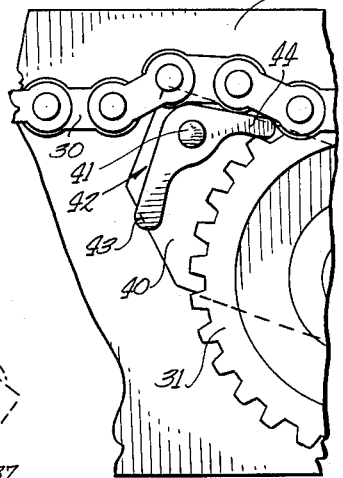
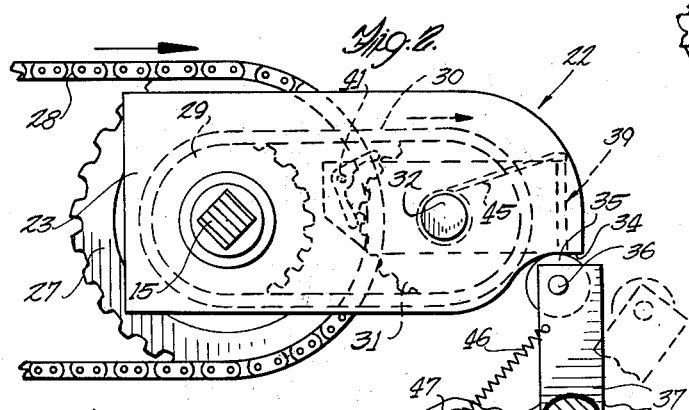
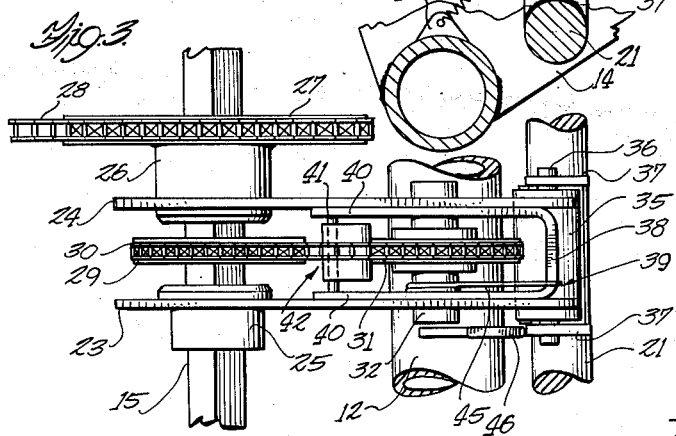
Inventor
Marvin D. Jennings
Paul O. Pippel
Attorney

United States Patent Office 3,101,826
Patented Aug. 27, 1963

3,101,826
INTERMITTENT CLUTCH
Marvin D. Jennings, Naperville, Ill., assignor to International Harvester Company, Chicago, Ill., a corporation of New Jersey
Filed Dec. 18, 1961, Ser. No. 159,931
8 Claims. (Cl. 192—23)

This invention relates to clutches, and has for its principal object the provision of a novel clutch mechanism for planters and the like to control the operation of the seed dispensing apparatus.

Another object of the invention is the provision of simple and efficient clutch mechanism for planters, fertilizer distributors and the like, interposed in the means for driving the seed dispensing apparatus of the planter.

Another object of the invention is the provision of an improved clutch for planters and the like adapted for mounting in a constantly rotating drive shaft and effective intermittently to transmit drive to a planter unit to be operated.

Other objects and advantages of the invention will become clear from the following detailed description when read in conjunction with the accompanying drawings wherein:

FIGURE 1 is a diagrammatic view in perspective of a portion of a planter having incorporated therein the features of this invention;

FIGURE 2 is a detail in side elevation, and partly in section, showing the clutch mechanism of this invention;

FIGURE 3 is a plan view of the structure shown in FIGURE 2; and

FIGURE 4 is an enlarged detail of the clutch engaging apparatus.

For purposes of illustration the planter 10 shown in FIGURE 1 is of the check row type and its details of construction form no part of this invention. However, it may be understood that the planter has a frame 11 which includes a transversely extending cylindrical bar 12, hitch means 13 by which the implement is connected to a tractor, or the like, and uprights 14 secured to member 12.

It may be understood that a drive shaft 15 rotatably carried by uprights 14 has a sprocket wheel 16 secured thereto drivingly connected by a chain 17 to a ground wheel 18 carried by the frame. Also mounted on the frame bar 12 is a planter unit 19 having conventional seed dispensing apparatus indicated at 20.

The planter represented in diagrammatic FIGURE 1 is a portion of a check row planter of well known construction having a check shaft 21 operated by the usual check wire apparatus, not shown, the shaft 21 being rocked about its axis periodically.

The clutch mechanism of this invention comprises a housing or cage 22 comprising laterally spaced plates 23 and 24, member 23 being mounted at one end upon a bearing 25 in which shaft 15 is rotatably received, and member 24 of the housing is secured to a bearing 26 having affixed thereto a sprocket wheel 27. Bearing 26 likewise rotatably receives shaft 15, and sprocket wheel 27 is drivingly connected by a chain 28 with the planter seed dispensing apparatus 20 in any suitable manner well known in the art.

To the drive shaft 15 between side plates 23 and 24 of housing 22 is another sprocket wheel 29, constantly rotatable with the shaft and connected by a chain 30 with an idler sprocket 31 mounted on a pin 32 carried in openings provided in side plates 23 and 24. It should thus be clear that while the planter is being propelled over the ground, drive shaft 15 is revolving. Sprocket wheel 29 mounted on the shaft is likewise revolving and, through chain 30, driving the idler sprocket wheel 31.

As will be observed particularly well in FIGURE 2, the lower outer edges of side plates 23 and 24 of the cage 22 are provided with an arcuate recess 33 forming a horizontal shoulder or abutment 34, which rests upon a roller 35 mounted upon a pin 36 carried between the upper ends of a pair of lugs 37 affixed, as by welding, to check shaft 21 and extending upwardly therefrom.

Also resting upon roller 35 is the transverse portion 38 of a U-shaped member 39 serving as a locking arm for the clutch and having side arm sections 40 pivotally mounted upon pin 32.

A pin 41 is carried between the ends of arms 40 and has pivotally mounted thereon a locking dog 42 in the form of a bellcrank having a counter-balance arm 43 and a locking arm 44. A coil spring 45 anchored at one end to pin 32, has its other end engageable with the upper edge of the transverse portion 38 of locking arm 39 to urge it downwardly into engagement with roller 35.

At each intermittent rocking movement of check shaft 21, the lugs 37 rock to the dotted line position of FIGURE 2, allowing arm 39 to drop downwardly, causing dog 42 at the other end of the locking arm to wedge itself between chain 30 and sprocket wheel 31, arm 44 penetrating the space between adjacent teeth of sprocket wheel 31, in the manner shown in FIGURE 4. Immobilization of chain 30 and sprocket wheel 31 forces the cage 22 to execute a complete revolution, driving with it sprocket wheel 27 and chain 28 to actuate the seed dispensing mechanism 20. Upon completion of a revolution, the cage 22 returns to the position shown in FIGURES 2 and 3, lugs 37 being biased to return to the solid line position of FIGURE 2 by a tension spring 46 anchored at one end to a lug 47 secured to frame member 12, and at its other end to one of the lugs 37.

Upon return of the clutch housing 22 to the position of FIGURE 2, locking arm 39 also engages roller 35, rocking the locking arm counter-clockwise to release dog 42 from its locked position. This procedure is repeated each time check shaft 21 is rocked by operation of the check wire, not shown, or other suitable means, to cause the clutch to engage and operate the dispensing mechanism 20.

It is believed that the function and operation of the novel clutch apparatus of this invention will be clearly understood from the foregoing description. It should likewise be understood that the invention has been described in its preferred embodiment and that modifications may be made therein without departing from the spirit of the invention or the scope of the appended claims.

What is claimed is:

1. In clutch apparatus for planters and the like, a supporting frame, a drive shaft mounted for constant rotation on the frame and having a driving sprocket secured thereto, a housing mounted on and journaling the drive shaft, an intermittently driven sprocket secured to the housing coaxially with said shaft and rotatable with the housing, an idler sprocket mounted for free rotation on the housing, an endless chain operatively connecting said drive sprocket and said idler sprocket, and locking means mounted in said housing and optionally engageable with said endless chain for locking the latter and the housing together as a unit to cause the housing and the intermittently driven sprocket to revolve about the axis of said drive shaft.

2. In clutch apparatus for planters and the like, a supporting frame, a drive shaft mounted for constant rotation on the frame and having a driving sprocket secured thereto, a housing mounted on and journaling the drive shaft, an intermittently driven sprocket secured to the housing coaxially with said shaft and rotatable with the housing, an idler sprocket mounted for free rotation on the housing, an endless chain operatively connecting said drive sprocket and said idler sprocket, locking means mounted in said housing and optionally engageable with said endless chain for locking the latter and the housing together as a unit to cause the housing and the intermittently driven sprocket to revolve about the axis of said drive shaft, and spring means cooperative between the housing and said locking means to bias the latter into said locking engagement with said chain.

3. In clutch apparatus for planters and the like, a supporting frame, a drive shaft mounted for constant rotation on the frame and having a driving sprocket secured thereto, a housing mounted on and journaling the drive shaft, an intermittently driven sprocket secured to the housing coaxially with said shaft and rotatable with the housing, an idler sprocket mounted for free rotation on the housing, an endless chain operatively connecting said drive sprocket and said idler sprocket, locking means mounted in said housing and optionally engageable with said endless chain for locking the latter and the housing together as a unit to cause the housing and the intermittently driven sprocket to revolve about the axis of said drive shaft, spring means cooperative between the housing and said locking means to bias the latter into said locking engagement with said chain, and releasable means mounted on the frame for normally holding said locking means out of locking engagement with said chain against the action of said spring.

4. The invention set forth in claim 1, wherein said locking means includes a dog mounted on said housing and movable to and from a wedging position between the chain and the periphery of the idler sprocket.

5. In clutch apparatus for an implement having a part adapted to be intermittently operated, a frame, a drive shaft mounted for constant rotation on the frame and having a driving member secured thereto, a housing mounted on and journaling the drive shaft and having an intermittently rotatable member secured thereto coaxially with said drive shaft, and means for locking the housing to the shaft to cause the housing and said intermittently rotatable member to revolve about the axis of the shaft and transmit power to operate said implement part, comprising a freely rotatable member mounted on the housing on an axis parallel to said driving member, endless power transmission means operatively connecting said driving and freely rotatable members, and a locking member mounted on said housing and optionally movable to a position in operative engagement with said freely rotatable member to lock the latter to the housing.

6. The invention set forth in claim 5, wherein said driving and freely rotatable members are sprocket wheels and said power transmission means is a chain drivingly connecting said wheels.

7. The invention set forth in claim 6, wherein said locking member includes a dog movable into and out of a wedging position between said chain and the periphery of said freely rotatable sprocket wheel.

8. The invention set forth in claim 7, wherein releasable means are provided for holding said dog out of said wedging position.

References Cited in the file of this patent
UNITED STATES PATENTS

| | | |
|---|---|---|
| 1,238,157 | Letz | Aug. 28, 1917 |
| 1,327,090 | Dennis | Jan. 6, 1920 |
| 2,208,119 | Chandler | July 16, 1940 |